# United States Patent [19]

Idemoto et al.

[11] 4,313,808
[45] Feb. 2, 1982

[54] ELECTRODIALYZER AND METHOD OF REGENERATING WASTE PHOTOGRAPHIC PROCESSING SOLUTION

[75] Inventors: Noboru Idemoto, Tokuyama; Minoru Yamada, Minami-ashigara; Mamoru Tashiro, Minami-ashigara; Sachio Matsushita, Minami-ashigara, all of Japan

[73] Assignee: Fuji Photo Film Co., Ltd., Minami-ashigara, Japan

[21] Appl. No.: 159,567

[22] Filed: Jun. 16, 1980

[30] Foreign Application Priority Data

Jun. 15, 1979 [JP] Japan ................................. 54-76158

[51] Int. Cl.$^3$ ............................................. B01D 13/02
[52] U.S. Cl. ................................. 204/180 P; 204/301
[58] Field of Search .................... 204/180 P, 301, 151, 204/109, 130

[56] References Cited

U.S. PATENT DOCUMENTS

| | | | |
|---|---|---|---|
| 2,860,095 | 11/1958 | Katz et al. | 204/180 P |
| 3,395,087 | 7/1968 | McElhinney et al. | 204/180 P |
| 4,089,760 | 5/1978 | Ono | 204/151 X |
| 4,204,930 | 5/1980 | Ono et al. | 204/180 P |
| 4,207,157 | 6/1980 | Hirai et al. | 204/180 P |

Primary Examiner—Arthur C. Prescott
Attorney, Agent, or Firm—Sughrue, Mion, Zinn, Macpeak and Seas

[57] ABSTRACT

A method of regenerating a waste photographic processing solution (e.g., a waste developing solution or a waste bleaching-fixing solution) by electrodialysis utilizing ion exchange membranes, which uses an electrodialyzer characterized by the arrangement of ion exchange membranes employed therein that a space between a cathode and an anode is partitioned by cation exchange membranes and anion exchange membranes alternately arranged, and an anode compartment is provided in a first place in the direction from the anode to the cathode, and wherein there is further provided a plural number of desalting compartments through each of which the waste photographic processing solution is passed, each of which compartments is partitioned by a cation exchange membrane on the cathode side and by an anion exchange membrane on the anode side, and an equal number of concentrating compartments, through each of which a specific solution for the concentrating compartment is passed, and each of which compartments is partitioned by an anion exchange membrane on the cathode side and by a cation exchange membrane on the anode side) arranged alternately in such a way that a desalting compartment is positioned on the side farthest from the anode, wherein a concentrating compartment that it is partitioned by cation exchange membranes on both sides thereof is provided adjacent to the cathode side of the desalting compartment partitioned on the side farthest from the anode, and a cathode compartment is provided adjacent to the last concentrating compartment, and wherein a common solution of electrolytes is supplied to both the cathode and the anode compartments of the electrolyzer and circulated therethrough.

7 Claims, 3 Drawing Figures

ELECTRODIALYZER AND METHOD OF REGENERATING WASTE PHOTOGRAPHIC PROCESSING SOLUTION

BACKGROUND OF THE INVENTION

1. Field of the Invention

This invention relates to a method of regenerating and re-using a waste photographic processing solution and particularly, it is concerned with the way of arranging ion exchange membranes in an electrodialyzer which is employed for regenerating a waste photographic processing solution by the removal of bromine ion and/or iodine ion from the waste solution when the photographic processing solution is a developing solution for a silver halide photosensitive material, and by the removal of silver ion, halide ions and so on from the waste solution when the processing solution is a bleaching-fixing solution for a silver halide photosensitive material, or the like using the ion exchange membrane electrodialysis.

More particularly, the present invention relates to a method of regenerating waste photographic processing solutions through the ion exchange membrane electrodialysis method in which the ion exchange membranes used have an improved life-span, and wherein the regeneration work can be carried out safely and with high efficiency.

2. Description of the Prior Art

When optically exposed silver bromide, silver iodide, and/or silver chloride in emulsion layers of a sensitive material is reduced with a developing agent in a photographic developing solution in a developing process, a silver image is formed in the emulsion layers, and, at the same time, the oxidation product of the developing agent and bromine ion, iodine ion and/or chlorine ion are yielded as by-products therein.

As the bromine ion and/or the iodine ion yielded as the by-product in the developing process is accumulated in the waste solution of the developing solution, it adversely affects the photographic characteristics. Therefore, in order to regenerate the waste developing solution to enable the re-use thereof, the removal of these halide ions from the waste developing solution must be effected.

The developing process of a color photographic light sensitive material includes desilvering both the silver image formed by redox reactin with a developing agent and optically unexposed silver halides using a bleaching solution, and, subsequently, a fixing solution, or using a bleaching-fixing solution to finally obtain the color image alone.

In the bleach-fixation processing of color photographic light sensitive materials, silver thiosulfate and halide ions are accumulated in the bleaching-fixing solution, and a part of an organic acid-Fe(III) complex ion is converted into the corresponding organic acid-Fe(II) complex ion, resulting in a decrease in the power to oxidize silver; therefore the removal of both of the abovedescribed salt and ions from the waste bleaching-fixing solution and the oxidation of the Fe(II) complex ion for the purpose of conversion into the corresponding Fe(III) complex ion are indispensable for the re-use of the waste bleaching-fixing solution through a regeneration process.

Methods of removing halide ions from the waste solution of photographic developing solutions and of removing silver thiosulfate and halide ions from the waste solution of bleaching solutions have included ion exchange membrane electrodialysis, in which electrodialysis is carried out using an electrodialyzer. In such cells, the space between a cathode and an anode is partitioned by cation exchange membranes and anion exchange membranes alternately to form, in the direction from the cathode to the anode, a cathode compartment, an alternately arranged plurality of desalting compartments (in which each compartment is partitioned by a cation exchange membrane on the cathode side and by an anion exchange membrane on the anode side) and of concentrating compartments (in which each compartment each is partitioned by an anion exchange membrane on the cathode side and by a cation exchange membrane on the anode side), and an anode compartment. The method involves pouring a waste developing solution into the desalting compartments, and a sodium sulfate solution or a sodium carbonate solution into the concentrating compartments, and then passing a direct current between the cathode and the anode. For instance, experimental data regarding the removal of bromine ion from a waste developing solution under the conditions wherein the current density of an ion exchange membrane is adjusted at from 0.50 A/dm$^2$ to 2.0 A/dm$^2$ are reported in S. Mizusawa, A. Sasai and N. Mii, *Bulletin of the Society of Scientific Photography of Japan*, No. 18 (December), pages 38–44 (1968).

In addition, methods of regenerating photographic developing solutions by means of ion exchange membrane electrodialysis are also described in published unexamined Japanese Patent Application (OPI) Nos. 97432/'76 and 85722/'76 (std. OPI def.), and in published examined Japanese Patent Application 34940/'77. Moreover, another method is also known, as described in Japanese Patent Application (OPI) Nos. 46732/'78, 8626/'79 and 19741/'79, in which a contact treatment with a polymer or a resin is conducted before or simultaneously with the dialysis of the waste developing solution with the intention of improvement upon the efficiency of the above-described regeneration methods and continuation of the life-span of the membranes used in electrodialysis.

A method of regenerating the waste solution of a photographic bleaching-fixing solution by ion exchange membrane electrodialysis is described in Japanese Patent Application (OPI) No. 60371/'78.

However, in each of the above-described methods, the arrangement of ion exchange membranes in an ion exchange membrane electroldialytic cell consists only of combinations of the anion exchange membranes and cation exchange membranes as shown in FIG. 1 and FIG. 2 hereinafter.

In the electrode compartments of these electrodialytic cells, solutions of electrolytes such as sodium sulfate, sodium hydroxide, potassium hydroxide and sulfuric acid, are usually employed. Although useful, the above-described methods suffer from serious defects as described below.

One of such defects occurs when the membranes are arranged in a combination as shown in FIG. 1, and a solution for concentration compartments, a solution for electrode compartments and a waste developing solution are made to flow through their respective pathways shown in FIG. 1.

With respect to the solution supplied to the electrode compartments, anions dialyzed when the solution passes through the cathode compartment, and cations are dialyzed when the solution passes through the anode compartment. Consequently, the concentration of the electrolyte in the solution decreases, causing an increase in electric resistance, whereby ultimately it becomes impossible to continue electrodialysis. Therefore, supplementing to make up for the decreased concentration of the electrolyte is required for the continuous operation of regeneration. However, such supplementing procedures are troublesome and an inconvenience.

On the other hand, in a regeneration method wherein an cathode and an anode are connected with each other through membranes having an arrangement as shown in FIG. 2, which arrangement is disclosed in Japanese Patent Application (OPI) No. 97432/'76, though it does not suffer the above-described disadvantage caused in the method as illustrated in FIG. 1, suffers from the defect that bromine ion is permeated into the anode compartment by dialysis, and is oxidized therein to produce bromine gas.

SUMMARY OF THE INVENTION

Therefore, an object of the present invention is to provide a novel method of regenerating a waste photographic processing solution without the above-described defects.

The above-described object is attained by adopting a particular arrangement of ion exchange membranes described and illustrated in detail below, and that, by supplying, in a circular flow pattern, a common solution of electrolytes to both cathode and anode compartments.

An electrodialyzer used according to this invention comprises, space between a cathode and an anode which is partitioned by cation exchange membranes and anion exchange membranes alternately arranged, and an anode compartment is provided in the first place in the direction from the anode to the cathode, wherein there is further provided a plural number of desalting compartments, each of which is partitioned by a cation exchange membrane on the cathode side and by an anion exchange membrane on the anode side, and an equal number of concentrating compartments, each of which is partitioned by an anion exchange membrane on the cathode side and by a cation exchange membrane on the anode side, arranged alternately in such a way that the desalting compartment is positioned on the side farthest from the anode and further, a concentrating compartment which is partitioned by cation exchange membranes on both the cathode and the anode sides thereof is provided adjacent to the cathode side of the desalting compartment positioned on the side farthest from the anode, and an cathode compartment is provided adjacent to the last concentrating compartment. By using the ion exchange membrane electrodialyzer having the above-described structure, and by supplying a common solution of electrolytes to both the cathode and the anode compartments and circulating said solution therebetween, and by passing a waste photographic processing solution through the desalting compartments and by passing a certain solution through the concentrating compartment, it becomes feasible to eliminate the defects and problems as described above from the regeneration method using ion exchange membrane electrolydialysis. An example of an embodiment of the present invention is shown in FIG. 3.

BRIEF DESCRIPTION OF THE DRAWINGS

In FIGS. 1 to 3, anion exchange membranes are indicated by the capital letter A, cation exchange membranes are indicated by the capital letter K, desalting compartments are indicated by the capital letter D, concentrating compartments are indicated by the capital letter C, and electrode compartments are indicated by the capital letter E.

DETAILED DESCRIPTION OF THE INVENTION

Figure 1:
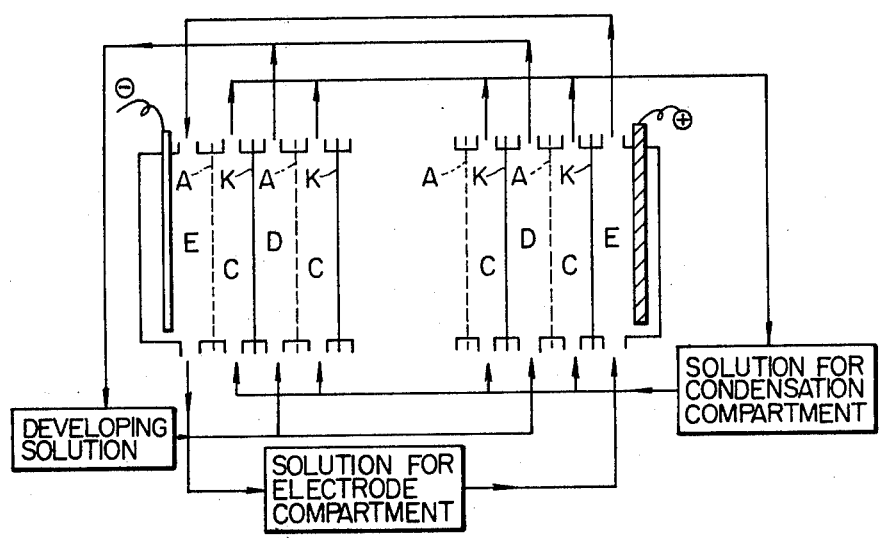
FIG. 1 and FIG. 2 are schematic cross-section diagrams illustrating conventional methods of regenerating waste photographic processing solutions using electrodialyzer using conventional arrangements of ion exchange membranes.
Figure 2:
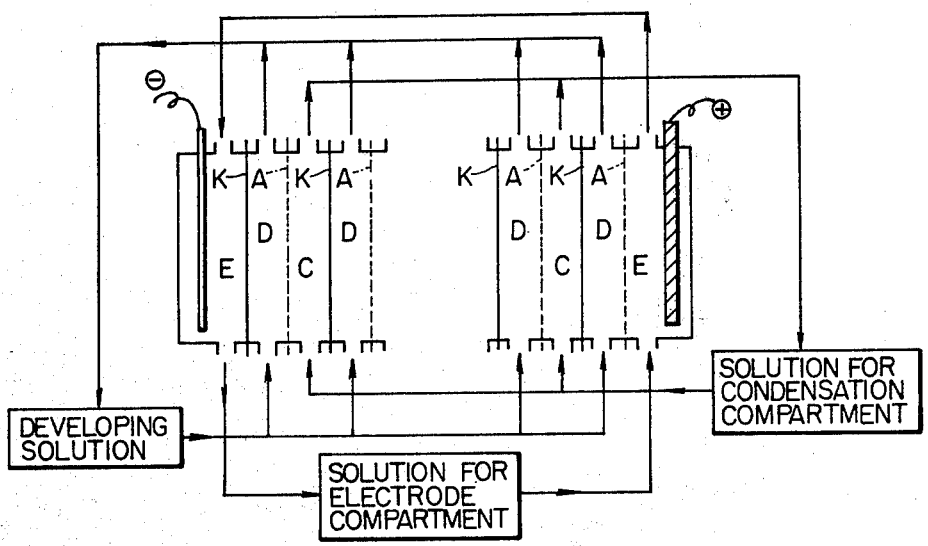

Any anion exchange membranes capable of exchanging their anions with any other anions, and any cation exchange membranes capable of exchanging their cations with other cations may be included in the ion exchange membranes usable in the electrodialyzer of the invention. However, strong base type anion exchange membranes and strong acid type cation exchange membranes are particularly preferable.

Preferable examples of a solution which can be supplied to the electrode compartments of the present invention are solutions of electrolytes, including, for example; salts such as sodium sulfate, potassium sulfate, sodium carbonate, potassium carbonate, sodium phosphate, potassium phosphate, sodium nitrate, potassium nitrate, sodium hydrogensulfate, sodium hydrogencarbonate, and so forth; alkalis such as potassium hydroxide, sodium hydroxide, and so forth; and acids such as sulfuric acid, and so forth. As for the concentration of the solution of such an electrolyte, 0.001 N or above is sufficient, and 0.01 to 2 N is more preferable for the purposes of this invention.

To these electrolyte solutions, optionally there can be added: aminopolycarboxylic acids (for example, ethylenediaminetetraacetic acid or the ammonium salt thereof, the sodium salt thereof, the potassium salt thereof, etc.; diethylenetriaminepentaacetic acid or the sodium salt thereof; ethylenediamine-N-($\beta$-oxyethyl)-N,N',N'-triacetic acid or the sodium salt thereof, the ammonium salt thereof, etc.; nitrilotriacetic acid or the sodium salt thereof; triethylenetetraaminehexaacetic acid or the sodium salt thereof; and iminodiacetic acid), aminopolyphosphonic acids (for example; 1,3-diaminopropanol-N,N,N',N'-tetramethylenesulfonic acid, 2-phosphonobutane-1,2,4-tricarboxylic acid, 1,3-propylenediamine-N,N,N',N'-tetramethylenephosphonic acid, 1-hydroxyethane-1,1-diphosphonic acid, etc.), sodium hexametaphosphate, sodium tripolyphosphate, sodium pyrophosphate, 2-phosphoethylimido-N,N-diacetic acid, and so on.

According to the invention, electrolyte solutions supplied to the concentrating compartment may contain such salts as sodium sulfate, sodium carbonate, potassium sulfate, potassium carbonate, sodium phosphate, potassium phosphate, sodium nitrate, potassium nitrate, sodium hydrogensulfate, sodium hydrogencarbonate and the like. Concentrations of these electrolyte solutions of 0.001 N or above ar sufficient, and concentrations from 0.01 to 2 N are more preferably for the purposes of the invention.

If desired, other compounds can be also added to the above described electrolyte solutions, such as aminopolycarboxylic acids (such as ethylenediaminetetraacetic acid or the sodium, ammonium or potassium salt thereof, diethylenetriaminepentaacetic acid or the sodium salt thereof, ethylenetriamine-N-($\beta$-oxyethyl)-N,N',N'-triacetic acid or the sodium or ammonium salt thereof, nitrilotriacetic acid or the sodium salt thereof, triethylenetetraaminehexaacetic acid or the sodium salt thereof, iminodiacetic acid and the like), aminopolyphosphoric acids (such as 1,3-diaminopropanol-N,N,N',N'-tetramethylenephosphonic acid, 2-phosphonobutane-1,2,4-tricarboxylic acid, 1,3-propylenediamine-N,N,N',N'-tetramethylenephosphonic acid, 1-hydroxyethane-1-diphosphonic acid and the like), sodium hexametaphosphate, sodium tripolyphosphate, sodium pyrophosphate, 2-phosphoethylimido-N,N-diacetic acid and so on as a decalifier.

Further, in the case of the regeneration of a waste developing solution, the corresponding waste developing solution, and in the case of the regeneration of a waste bleaching-fixing solution, the corresponding bleaching-fixing solution, or a solution containing both thiosulfate and sodium sulfite, may be employed as the solution to be supplied to the concentrating compartment.

Specific examples of the material of the cathode that can be employed in the above-described electrodialyzer and electrolyzer include iron, nickel, lead, zinc, stainless steel and the like. Specific examples of the material for the anode include platinum, platinum plated titanium, graphite and the like.

The density of electric current required to be passed for the ion exchange membrane electrodialysis of such a waste solution used for developing processing depends upon the characteristics of the ion exchange membranes used and the properties of the waste solution to be regenerated. However, it generally ranges from 0.1 $A/dm^2$ to 10 $A/dm^2$, and preferably from 0.2 $A/dm^2$ to 5 $A/dm^2$.

The method of this invention for the regeneration of a waste photographic developing solution or a waste bleaching-fixing solution using the ion exchange membrane electrodialysis may also involve the contact treatment of the waste solution with a certain adsorbent, specific examples of which include such polymers, resins and various kinds of ion exchange membranes (e.g., Diaion SA-10 A, SA-20 A, PA-316, PA-418, WA-11, WA-20, CR-10, PK-220, PK-208, Duolite S-37 and Amberlite IR-410) as described in Japanese Patent Application (OPI) Nos. 46732/'78, 146236/'77, 9626/'79, 19741/'79, 132343/'78 and so on. The contact treatment should be carried out just before or simultaneously with the supplying of the waste solution to the desalting compartments.

The present method for the regeneration of a waste processing solution using ion exchange membrane electrodialysis further may involve a batch model operation in which a waste solution discharged from a photographic processing machine is accumulated and left unregenerated for a time, and halide ions, salts, silver and so on are removed or recovered therefrom using the ion exchange membrane electrodialyzer of the invention (optionally, in combination with the electrolysis), and desired ingredients can be added to the processing solution regenerated in supplemental amounts to prepare a processing solution to be re-used as a replenisher.

Furthermore, the method may also involve the so-called continuous regeneration process, in which by continual detection of a specific component, preferably bromide ion, of the photographic processing solution discharged continuously from a photographic processing machine, bromide ion is continuously removed from the processing solution discharged in such a portion as to keep the concentration of bromide ion censtant by means of the dialysis as the flow rate of electric current to be sent to the ion exchange membrane electrodialyzer is controlled; such method is described in Japanese Patent Application (OPI) No. 37731/'79, and to the thus-obtained solution desired ingredients can be added in order to reuse the resulting processing solution as a replenisher.

In addition, the concentrated solution may be properly diluted with water in order to carry on the electrodialysis as the current efficiency is maintained on a high level.

More particularly, the concentrated solution can be diluted with water so as to keep the halide ion concentration therein constant; for example, it is desirable to keep the bromide ion concentration at a constant value within the range of 2 to 20 g/l (converted to a potassium bromide basis) in the above-described continuous regeneration method from the viewpoints that due to keeping the bromide ion concentration in the developing solution at a constant value variation in photographic quality can be reduced, and that the current efficiency can be kept high when the removal of bromide ion from the developing solution is effected. The supplement of water to dilute the concentrated solution can use a pump, operating, e.g., coordinatedly with the pump for supplying a replenisher to a developing tank installed with an automatic developing machine in such an amount as to correspond to the number of sensitive sheets developed. This is more desirable from the viewpoints that the bromide ion concentration in the concentrated solution is kept at an approximately constant value, and that the developing solution becomes more stable, and, consequently, highly efficient dialysis can be carried on.

Since the bromide ion concentration in the concentrated solution increases with time spent in dialysis in the above-described batch process, it is preferable to go on diluting the concentrated solution during dialysis by going on supplying a constant volume of water using a pump so that the bromide ion concentration in the concentrated solution may be controlled at from 2 to 30 g/l (converted to a KBr basis).

A developing solution to be regenerated using the method of the present invention can contain known developing agents. Specific examples of the known developing agent include hydroxybenzenes (e.g., hydroquinone), 3-pyrazolidones (e.g., 1-phenyl-3-pyrazolidone), aminophenols (e.g., N-methyl-p-aminophenol), 1-phenyl-3-pyrazolines, ascorbic acid, heterocyclic compounds produced by the condensation of 1,2,3,4-tetrahydroquinoline ring with an indoline ring, as described in U.S. Pat. No. 4,067,872; and so on. These developing agents may be used individually or in combinations thereof. The developing solution can contain additionally, in general, known preservatives, alkali agents, pH buffering agents, and antifogging agents and further, optionally, dissolving aids, color toning agents, development accelerators, surface active agents, defoaming agents, water softeners, hardeners, viscocity-conferring agents, and so on.

A color developing solution which can be regenerated using the method of the present invention comprises generally of an alkaline aqueous solution containing a color developing agent. As for the color developing agent, known aromatic primary amine developers such as phenylenediamines (e.g., 4-amino-N,N-diethylaniline, 3-methyl-4-amino-N,N-diethylaniline, 4-amino-N-ethyl-N-$\beta$-hydroxyethylaniline, 3-methyl-4-amino-N-ethyl-N-$\beta$-hydroxyethylaniline, 3-methyl-4-amino-N-ethyl-N-$\beta$-methanesulfoamidoethylaniline, 4-amino-3-methyl-N-ethyl-N-$\beta$-methoxyethylaniline, etc.) may be employed.

In addition, color developing agents described in L.F.A. Mason, Photographic Processing Chemistry, pages 226–229, Focal Press (1966); U.S. Pat. Nos. 2,193,015 and 2,592,364; Japanese Patent Application (OPI) No. 64933/'73; and so on may be also employed.

The color developing solution can contain additionally pH buffering agents such as sulfites, carbonates, borates and phosphates of alkali metals and the like; development inhibitors or antifoggants such as bromides, iodides and organic antifoggants; and so on. Optionally, it can further contain water softeners, preservatives such as hydroxylamines, organic solvents such as benzylalcohol and diethylene glycol, quaternary ammonium salts, development accelerators such as amines, dye forming couplers, competitive couplers, fogging agents such as sodium borohydride, auxiliary developers, such as 1-phenyl-3-pyrazolidone, viscosity-conferring agents, chelating agents of the polycarboxylic acid series, as described in U.S. Pat. No. 4,083,723; antioxidants as described in Germany Patent Application OLS No. 2,622,950; and so on.

A bleaching-fixing solution capable of being regenerated using the method of the invention can contain, as bleaching agents, compounds of polyvalent metals such as Fe(III), Co(IV), Cr(VI), Co(II) and the like; peroxy acids; quinones; nitroso compounds; and so on. More specifically, ferricyanates, dichromates and complex salts of Fe(III) or Co(IV) with organic acids such as aminopolycarboxylic acids (e.g., ethylenediamine tetraacetic acid, nitrilotriacetic acid, 1,3-diamino-2-propanol tetraacetic acid and the like), citric acid, tartaric acid, malic acid and so on; persulfates and permanganates; nitrosophenol; and so on can be employed. Of these bleaching agents, potassium ferricyanate, (ethylenediaminetetraacetonato)Fe(III) sodium complex, and (ethylenediaminetetraacetonato)Fe(III) ammonium complex are particularly useful. Various kinds of additives can also be added to the bleaching-fixing solution, such as bleaching accelerators, as described in U.S. Pat. Nos. 3,042,520 and 3,241,966; Japanese Patent Publication Nos. 8506/'70 and 8836/'70; and so on, and thiol compounds as described in Japanese Patent Application (OPI) No. 65732/'78.

Moreover, silver halide photographic light sensitive material and photographic processing solutions which can employed in embodiments of the invention may be constituted with their respective typical ingredients, as described in L.F.A. Mason, *Photographic Processing Chemistry*, Focal Press (1974), H. James, *The Theory of the Photograhic Process*, MacMillan Publishers (1977) and *Research Disclosure*, No. 17643 (December, 1978).

In accordance with the invention, a number of advantages result, such as:

(i) the composition of an electrolyte solution supplied to the electrode compartments remains constant throughout the electrodialytic operation, which makes it needless to supplement any ingredients (if a decrease in water content takes place, only water need be supplemented) and facilitates a long running work for regeneration of a processing solution; that is to say, the regeneration of a processing solution is advantageously controlled.

(ii) gases detrimental to health are not produced because oxidation of halide ions is not caused.

(iii) there is no fear of contamination of a developing solution with foreign matter, because the developing solution circulating among the desalting compartments D is separated from the electrode compartments (a cathode compartment and an anode compartment) by a concentrated solution.

(iv) although in the membrane arrangement as shown in FIG. 1 the resistance at the anion membrane adjacent to the cathode compartment increases with the progress of dialysis and at last, pin-holes are produced in the anion membrane to fatally damage the membrane (the reason for this are not fully understood) but this phenomenon is not caused throughout the regeneration process of this invention, resulting in prolongation of the life-span of the membrane and stabilization of the dialysis effect.

(v) a lowering in current efficiency does not occur, because a drop in the concentration of electrolytes in the solution supplied to the electrode compartments does not take place.

Furthermore, the embodiment of the present invention involves the combined use of the dialyzer of the present invention with an electrolyzer as described in Japanese Patent Application (OPI) Nos. 34939/77, 84636/76 and 97432/76, or as described in Japanese Patent Application (OPI) No. 60371/78.

The present invention will not be illustrated in greater detail by reference to the following examples. However, the invention is not intended to be construed as being limited to these examples.

EXAMPLE 1

Fuji color papers exposed by means of a conventional printer were submitted to a continuous developing processing including the steps set forth in the following Table 3, using a conventional color paper automatic developing machine, a color developing solution having the composition shown in Table 1, a bleaching-fixing solution having the composition shown in Table 2, and a washing treatment with water.

TABLE 1

| Ingredient | Amount |
| --- | --- |
| Benzyl Alcohol | 15 ml |
| Diethylene Glycol | 8 ml |
| Disodium Ethylenediaminetetraacetate | 5 g |
| Sodium Sulfite | 2 g |
| Anhydrous potassium Carbonate | 30 g |
| Potassium Bromide | 0.6 g |
| 4-Amino-N-ethyl-N-($\beta$-methanesulfon-amidoethyl)-m-toluidine, 3/2 Sulfate: Monohydrate | 5 g |
| Dosium Hydroxide | to adjust pH to 10.20 |
| Water | to make total volume 1 l |

TABLE 2

| Ingredient | Amount |
| --- | --- |
| Ethylenediaminetetraacetic Acid | 2 g |
| (Ethylenediaminetetraacetonato)Fe(III) Complex Salt | 40 g |
| Sodium Sulfite | 5 g |
| Ammonium Thiosulfate | 70 g |
| Water | to make total volume 1 l |

TABLE 3

| Processing | Time | Temperature |
| --- | --- | --- |
| Color Development | 3 min 30 sec | 33° C. |
| Bleach-Fixation | 1 min 30 sec | 33° C. |
| Washing | 2 min 30 sec | 25–30° C. |

Figure 3:
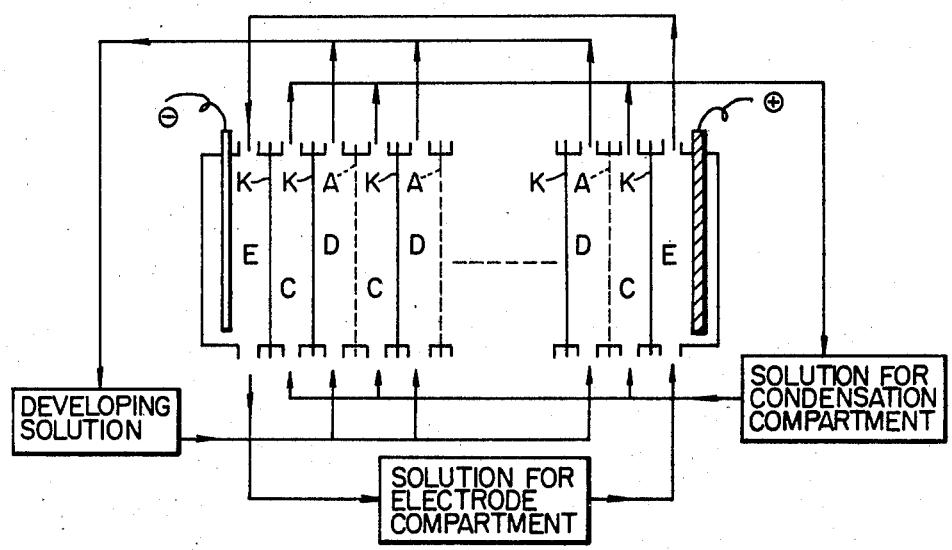
FIG. 3 is a schematic cross-section diagram illustrating a method of regenerating a waste photographic processing solution using an electrodialyzer including a novel arrangement of ion exchange membranes in accordance with this invention.

The desalting compartments of an ion exchange membrane electrodialyzer having the membrane arrangement of the invention as shown in FIG. 3, comprising of 10 sheets of strong base type anion exchange membranes, 12 sheets of strong acid type cation exchange membranes, each having an area of 2 dm$^2$, a stainless steel cathode and a platinum plated titanium anode was connected to the color developing tank of the automatic developing machine and the color developing solution was circulated therethrough. The dilute solution prepared by diluting the developing solution having the composition set forth in Table 1 with 4 times its volume with water was supplied to the concentrating compartments of the dialyzer of the present invention, and circulated therethrough. An electrolyte solution having the composition set forth in Table 4 was supplied to both the cathode and the anode compartments of the dialyzer of the invention, and circulated therethrough.

TABLE 4

| Ingredients | Amount |
| --- | --- |
| Sodium Carbonate | 29.3 g |
| Sodium Hydrogencarbonate | 6.4 g |
| Sodium Nitrilotriacetate | 1.0 g |
| water | to make 1 l (pH 10.20) |

Fuji color papers were developed as the KBr concentration in the color developing solution was controlled at 0.6±0.03 g/l by regulating the current density passed between the cathode and the anode electrodes of the cell within the range of from 0.5 to 3 A/2 dm$^2$. A replenisher prepared by adding supplemental amounts of ingredients necessary to re-use the developing solution overflowed from the developing tank of the color paper automatic developing machine as a replenisher to the overflowed developing solution was continually supplied to the developing tank, and the developing processings were carried out repeatedly. After one month running and three month running, respectively, properties of the solution in the electrode compartments were examined, and the following results were obtained.

|  | At the Start | After One Month | After Three Months |
| --- | --- | --- | --- |
| pH | 10.20 | 10.10 | 10.05 |
| m v/cm | 33 | 35 | 36 |

The developing solution could be regenerated and circularly re-used without constant attention to the drop in the dialytic power and without requiring the supplement of any ingredients except water supplemented in an amount corresponding to loss every month. This was accomplished without the production of harmful halogen gases, and therefor damage to the membranes and electrodes and deterioration in photographic characteristics did not occur, and continuous operation could be realized.

On the other hand, a dialyzing experiment was carried out in a similar manner as described above except, that a dialyzer having the membrane arrangement as shown in FIG. 1, wherein 11 sheets of anion exchange membranes and 11 sheets of cation exchange membranes were contained, was used. After one week running, the solution in the electrode compartment showed the pH value of 9.80 and the conductivity of 0.11 m μ/cm, and water was lost in a large quantity and electric resistance rose markedly. Consequently, it became impossible to continue the dialysis operation.

EXAMPLE 2

The waste color developing solution processed according to Kodak ME-4 process was circulated through the separate two dialyzers (effective membrane area: 2 dm$^2$), as follows: a first constructed of 10 desalting compartments, 10 concentrating compartments, one cathode compartment and one anode compartment and that, these compartments were partitioned with strong base type anion exchange membranes and strong acid type cation exchange membranes according to the membrane arrangement of this invention; and a second that differed only in the membrane arrangement from the former, i.e., the second had a membrane arrangement as shown in FIG. 1.

A solution containing 41 g/l of sodium carbonate monohydrate was supplied to the concentrating compartments and to the electrode compartments. Dialysis was continued for a period of 60 hours in each of the appratuses as electric current having the density of 1.5 A/dm$^2$ was passed therethrough. In both cases, conductivity of the solution in the electrode compartment and electric resistance of the membrane were measured. The results obtained are shown in Table 5.

TABLE 5

|  | Conductivity (m v/cm) | Electric Resistance of Membrane (Ω/cm$^2$) |
| --- | --- | --- |
| This Invention | 2.84 × 10 | 2.2 |
| Comparison Sample | 0.118 × 10 | 6.6 |
| Before Dialysis | 2.70 × 10 | 1.8–2.5 |

It is apparent from the above Table 5 that the conductivity of the electrode solution and the electric resistance of the membrane in the present invention remain almost unchanged, while in case of comparison these values changed sharply.

In the case of comparison sample, the dialysis was made to further continue over 60 hours. Then, the electric resistance of the membrane increased further, and finally, the production of pin-holes at the anion exchange membrane arranged adjacent to the cathode compartment was observed (viz., when the dialysis was continued for about 65 hours). On the other hand, in the case of the present invention, no increase in the electric resistance of the membrane and no pinholes were noticed even after the dialysis was continued for a period of 115 hours.

While the invention has been described in detail and with reference to specific embodiments thereof, it will be apparent to one skilled in the art that various changes and modifications can be made therein without departing from the spirit and the scope thereof.

What is claimed is:

1. A method for regenerating a waste photographic processing solution by electrodialysis utilizing ion exchange membranes comprising the steps of:
   (a) positioning in an electrodialyzer, a cathode and an anode;
   (b) partitioning the space between said cathode and anode by a plurality of cation exchange membranes and anion exchange membranes alternately arranged in such a way that a farthest membrane from the anode is a cation exchange membrane and a farthest membrane from the cathode is an anion exchange membrane, thus forming a plurality of desalting compartments and an equal number of concentrating compartments alternately arranged in such a way that a farthest compartment from the anode is a desalting compartment and a farthest compartment from the cathode is a concentrating compartment, each of said desalting compartments being partitioned by one of said cation exchange membranes on the cathode side and by one of said anion exchange membranes on the anode side thereof, and each of said concentrating compartments being partitioned by one of said anion exchange membranes on the cathode side and by one of said cation exchange membranes on the anode side thereof;
   (c) positioning a cation exchange membrane between the cathode and the farthest cation exchange membrane from the anode to form a concentrating compartment partitioned by cation exchange membranes on both saides thereof and a cathode compartment;
   (d) positioning a cation exchange membrane between the farthest anion exchange membrane from the cathode and the anode to form a concentrating compartment partitioned by one of said anion exchange membrane and said cation exchange membrane and and anode compartment;
   (e) providing a waste solution to be regenerated by each desalting compartment and circulating said waste solution therethrough;
   (f) providing an electrolyte solution to each of said concentrating compartments and circulating said electrolyte solution therethrough;
   (g) providing a common electrolyte solution to said cathode compartment and anode compartment and circulating said electrolyte solution therethrough; and
   (h) passing a direct electric current across the alternating membranes and compartments.

2. A method of regenerating a waste photographic processing solution as claimed in claim 1, further including the step of contacting said waste solution with an absorbent selected from the group consisting of polymers, resins, or ion exchange membranes.

3. A method of regenerating a waste photographic processing solution as claimed in claim 1, further comprising the utilization of a batch model operation wherein said waste solution discharged from said electrodialyzer is accumulated and allowed to remain unregenerated for a period of time, and halide ions, salts and silver are removed by utilizing said ion exchange membrane dialyzer and further wherein ingredients are added to the processing solution regenerated in supplemental amounts in order to prepare a processing solution to be reused as a replenisher.

4. A method for regenerating a waste photographic processing solution, as claimed in claim 1, wherein said method is carried out as a continuous regeneration process during which continual detection of bromide ion within the photographic processing solution discharged from the method is continuously carried out and wherein bromide ion is continuously removed from the processing solution discharged in such a proportion to maintain the concentration of bromide ion constant by means of dialysis as the flow rate of electric current to be sent to the ion exchange membrane dialyzer is controlled, and to the thus obtained solution adding ingredients in order to reuse the resulting processing solution as a replenisher.

5. A method for regenerating a waste photographic processing solution, as claimed in claim 4, further comprising diluting the solution with water in order to carry out the electrodialysis as the current efficiency is maintained at a high level.

6. A method for regenerating a waste photographic processing solution, as claimed in claim 1, wherein said solution contains developing agents selected from the group consisting of hydroxybenzene, 3-pyrazolidones, aminophenols, 1-phenyl-3-pyrazolines, ascorbic acid, and heterocyclic compounds.

7. An electrodialyzer of the type which includes an anode and a cathode, comprising:
   (a) a plurality of cation exchange membranes and anion exchange membranes for partitioning the space between said anode and cathode;
   (b) an anode compartment provided in a first place in the direction from the anode to the cathode;
   (c) a plurality of desalting compartments and an equal number of concentrating compartments alternately arranged in such a way that a farthest compartment from the anode is a desalting compartment, each of said desalting compartments being partitioned by one of said cation exchange membranes on the cathode side and by one of said anion exchange membranes on the anode side thereof, and each of said concentrating compartments being partitioned by one of said anion exchange membranes on the cathode side and by one of said cation exchange membranes on the anode side thereof;
   (d) a concentration compartment partitioned by one of said cation exchange membranes on each side thereof and placed adjacent to the cathode side of the desalting compartment positioned on the side farthest from the anode;
   (e) a cathode compartment provided adjacent to the last concentrating compartment partitioned by one of said cation exchange membranes on each side thereof;
   (f) a conduit means for circulating a common electrolyte through both said anode compartment and cathode compartment;
   (g) a conduit means for circulating a solution to be regenerated through each of said desalting compartments;
   (h) a conduit means for circulating an electrolyte solution for receiving ions through each concentrating compartment; and
   (i) a means for applying a direct current electrical potential across the solutions to thereby enable regeneration of waste photographic processing solution.

* * * * *